United States Patent [19]

Katano et al.

[11] Patent Number: 5,634,150
[45] Date of Patent: May 27, 1997

[54] COMPACT CAMERA WITH IMPROVED DISPLAY DEVICE AND MOUNTING BOARD LAYOUT

[75] Inventors: Yuji Katano, Kawasaki; Hiroshi Wakabayashi, Yokohama; Junichi Omi, Kawasaki; Kiyosada Machida, Urawa, all of Japan

[73] Assignee: Nikon Corporation, Tokyo, Japan

[21] Appl. No.: 527,884

[22] Filed: Sep. 14, 1995

Related U.S. Application Data

[63] Continuation of Ser. No. 117,945, Sep. 8, 1993, abandoned.

[30] Foreign Application Priority Data

Sep. 8, 1992 [JP] Japan .................. 4-239558
Oct. 1, 1992 [JP] Japan .................. 4-284998

[51] Int. Cl.⁶ ................................ G03B 17/18
[52] U.S. Cl. .............. 396/106; 396/281; 396/535
[58] Field of Search ...................... 354/403, 485, 354/288, 162, 166, 219, 471

[56] References Cited

U.S. PATENT DOCUMENTS

| | | | |
|---|---|---|---|
| 4,432,621 | 2/1984 | Suzuki et al. | 354/288 |
| 4,707,101 | 11/1987 | Akabane et al. | |
| 4,860,039 | 8/1989 | Hata et al. | 354/288 |
| 5,218,399 | 6/1993 | Izumi et al. | 354/471 |

FOREIGN PATENT DOCUMENTS

| | | |
|---|---|---|
| 2 498 343 | 7/1982 | France . |
| 41 13 546 | 10/1991 | Germany . |
| 2244563 | 4/1991 | United Kingdom . |
| 2249188 | 4/1992 | United Kingdom ............ 354/288 |

*Primary Examiner*—Russell E. Adams

[57] ABSTRACT

A compact camera apparatus having an improved display device and circuit mounting board layout within the camera body in relationship to other components to achieve a more compact and efficient space camera utilization. In one embodiment of the camera, a display unit is located on the upper surface of the camera body, and has a portion thereof, such as its drive mechanism at least partially positioned in a space formed between a light projection unit and light receiving of the camera's rangefinder device. In another embodiment, the camera has a mounting board of the required size for holding constituent control circuit components of the camera located in the camera body with attention to the location of the board in relationship to the cartridge compartment and other camera components to provide for a more compact design. A rigid mounting board is used as the mounting board and is located and incorporated within the camera body at the upper, inside portion of the camera body, in contact with the upper end of a reverse loading type cartridge compartment, and extending over a photographic lens barrel and to the upper side of a spool compartment. At least one or more camera components is arranged in a vacant space formed between the mounting board, the photographic lens barrel and the spool compartment. Furthermore, with the rangefinder device and a photometer device both mounted on the mounting board, a portion of the viewfinder unit is located on the lower side of the mounting board.

13 Claims, 4 Drawing Sheets

COMPACT CAMERA WITH IMPROVED DISPLAY DEVICE AND MOUNTING BOARD LAYOUT

This application is a continuation of application Ser. No. 08/117,945, filed Sep. 8, 1993, now abandoned.

BACKGROUND OF THE INVENTION

1. Field of the Invention

The invention relates to a camera with a rangefinder device, a photometer device, a viewfinder device, a display device with a rotary pointer, and a mounting board with control circuits incorporated into a compact camera body.

2. Description of the Related Art

For compact cameras, it is desirable to make the camera body small and compact for ease of carrying and handling. To accomplish this, the layout of the various components incorporated within the camera body must be compact and efficient. However, this is difficult to achieve because the camera body contains a photographic lens barrel, a spool compartment with a film windup spool, and a cartridge component into which a film cartridge is loaded and which camera body also contains other constituent camera components such as a photometer device, a rangefinder device, a viewfinder device, a display device, and others. The location of the constituent camera components within the camera body, such as a spool component and a cartridge component, a photographic lens barrel located in-between these, and a viewfinder device, etc., is limited to some degree. Furthermore, other constituent camera components such as a photometer device, a rangefinder device, or a mounting board for camera control circuits, have been incorporated into vacant space above or below the spool compartment, photographic lens barrel, and cartridge component, or incorporated into vacant space in the grip portion of the camera.

Display devices for cameras in the related art, such as one proposed in Japanese Patent Application 3-214613, indicate an index on a pointer scale by a rotatable pointer. This display device is fixed on the top of a camera body and is driven by a stepping motor. Although this display device is easy to see, because the stepping motor and the drive mechanism are mounted beneath the display scale, this display device is thicker than a liquid crystal display device and inhibits the reduction of the camera size.

To provide a smaller size camera in the related art, a flexible printed circuit board ("FPC") has usually been used as a mounting board to mount various electrical components, and has been incorporated into the camera body by using a space of the front surface or the upper side of the camera body. However, the flexible printed circuit boards are more expensive than rigid boards and have limitations on the mounting of control circuit components. Therefore, in the related art, one rigid board or a rigid board connected by divided flexible printed circuit boards, has been located in a suitable place within the camera body, such as in the upper side of the camera body.

Locating the rigid board in the upper side of the camera body, however, inhibits reducing and compacting the camera size. This is due to the large height of the rangefinder device, photometer device, and/or viewfinder device, and when these components are located between the rigid board and the photographic lens barrel, a space results between the rigid board and the upper end of the cartridge compartment.

In particular, depending on the loading direction of the film into the camera body, the loading type of the cartridge compartment is defined as either a sequential loading type or a reverse loading type. In the sequential loading type, the cartridge is loaded into the camera body in a direction with the convex portion on the cartridge end facing downwards. In this case, however, it is necessary to arrange the driving fork, and its drive mechanism unit used to drive the rotation of the film cartridge shaft, on the upper side of the camera body. Due to the locating space required for this, the mounting of the rigid board, having a large board surface, on the upper side of the camera body is inhibited. This leads to problems in designing a smaller and more compact camera.

The particular problem is that the mounting area of the rigid board needs to be a large as possible to provide a large degree of freedom for mounting components and for surfaces on which circuits are built. However, when the sequential loading type of cartridge compartment is used, the size of the board cannot be maintained.

On the other hand, in the reverse loading type of cartridge compartment, because the aforementioned fork and its drive mechanism unit can be located in the lower direction in the camera body, the size of the rigid board can be maintained. However, because of the arrangement of the rangefinder device and the photometer device on the rigid board, it is necessary for a space to be opened up between the rigid board and the cartridge compartment. Therefore, the size of the camera cannot be made smaller and more compact.

Moreover, when an Albada type of viewfinder device is used, because of its large size, the size of the rigid board remains large. Due to mounting of the viewfinder device on the rigid board, the height dimension of the camera must remain large.

In particular, the body of a compact camera must be as small as possible to make it more portable and more easily handled by making it more compact. To make the camera body more compact, the various components of the camera should be densely and efficiently incorporated within the camera body itself.

On the other hand, various kinds of electrical devices such as an automatic exposure mechanism, an autofocus mechanism, and a strobe have been incorporated into the camera body. To make the size of the mounting board as large as possible, and to design the camera to be smaller and more compact, the mounting board must be carefully located and the various components on this board must be efficiently located, thus leading to a reduction in cost.

SUMMARY OF THE INVENTION

It is therefore an object of the present invention to provide a compact camera equipped with a display device using a pointer and located in an optimum position.

A further object of the present invention is to make a large mounting board, having an inexpensive rigid board, to provide a large degree of freedom in the mounting of components or control circuits for various kinds of photographic operations, to incorporate and efficiently mount various constituent components on the mounting board, and to incorporate a reverse film loading type of cartridge compartment so that a comparatively inexpensive, small, and compact camera is obtained.

Additional objects and advantages of the invention will be set forth in part in the description which follows, and, in part, will be obvious from the description, or maybe learned by practice of the invention. These objects and advantages of the invention may be realized and obtained by means of the instrumentalities and combinations particularly pointed out in the appended claims.

To accomplish the foregoing objects of the present invention and in accordance with the purpose of the invention, a camera has a display device located on the upper surface of the camera body and contains a display scale with an index and a pointer. The pointer is rotated by a drive motor unit. In addition, a light projection unit projects light from a light projection window of the camera body front surface towards an object to be photographed, and a light receiving unit receives reflected light from the object to be photographed through a light receiving window of the front surface of the camera. A rangefinder device measures the distance to the object to be photographed from the output of the light receiving unit. The display device is located such that the portion of the display device is inserted into the space between the light projection unit and the light receiving unit, thus reducing the space required for the display device over that of the related art. Because the display device is located partially between the light projection unit and the light receiving unit, the height of the camera body can be reduced in comparison to the related art cameras where the display device is located above the light projection unit and the light receiving unit.

To further accomplish the objects of the present invention and in accordance with the purpose of the invention, as embodied herein, the camera has a mounting board incorporated into the camera body. The mounting board contains circuits used to control various photographic operations and has one rigid board, which extends along the upper side of the camera body above the cartridge compartment, photographic lens barrel and spool compartment. By making the film the reverse loading type and placing the mounting board in contact with the upper end portion of the cartridge compartment, the camera is designed to be made smaller and more compact. The camera itself has at least a photometer device, a rangefinder device, or a viewfinder device located in a vacant space formed between the mounting board and the photographic lens barrel and spool compartment. By installing a rangefinder device and a photometer device on a mounting board by using a rigid board, and by positioning one portion or the whole of the real image type of the viewfinder device on the lower side of the mounting board, the mounting board is cut away from interfering with the viewfinder device.

In the present invention, the mounting board for the control circuits is an inexpensive rigid board. The mounting board and the upper outer wall portion of a film reverse loading type of cartridge compartment are placed in contact, so that the camera is in its most dense and smallest size. The mounting board extends along the upper end side of the camera body, above the cartridge compartment, the photographic lens barrel, and the spool compartment. Furthermore, by suitably positioning the rangefinder device, photometer device, and/or viewfinder device in a vacant space between the mounting board and the photographic lens barrel, the size of the mounting board is kept as large as possible. Therefore, the effective use of space is increased, and a smaller and more compact camera can be achieved. For example, in the case where high portions exist in the viewfinder device, the size of the mounting board is maintained, cutting away only its interfering portions, the various constituent components are efficiently and compactly incorporated into the camera, and a smaller and more compact camera can be achieved.

BRIEF DESCRIPTION OF THE DRAWINGS

The accompanying drawings, which are incorporated in and constitute a part of the specification, illustrate embodiments of the invention and, together with a description, serve to explain the principles of the invention.

DESCRIPTION OF THE PREFERRED EMBODIMENTS

Reference will now be made in detail to the present preferred embodiments of the invention, examples of which are illustrated in the accompanying drawings.

The embodiments of the present invention relate to a compact camera which is smaller and more compact by reducing the space requirements for a mounting board and for a display device.

The first embodiment of the present invention will be described with reference to FIGS. 1-3.

Figure 1:
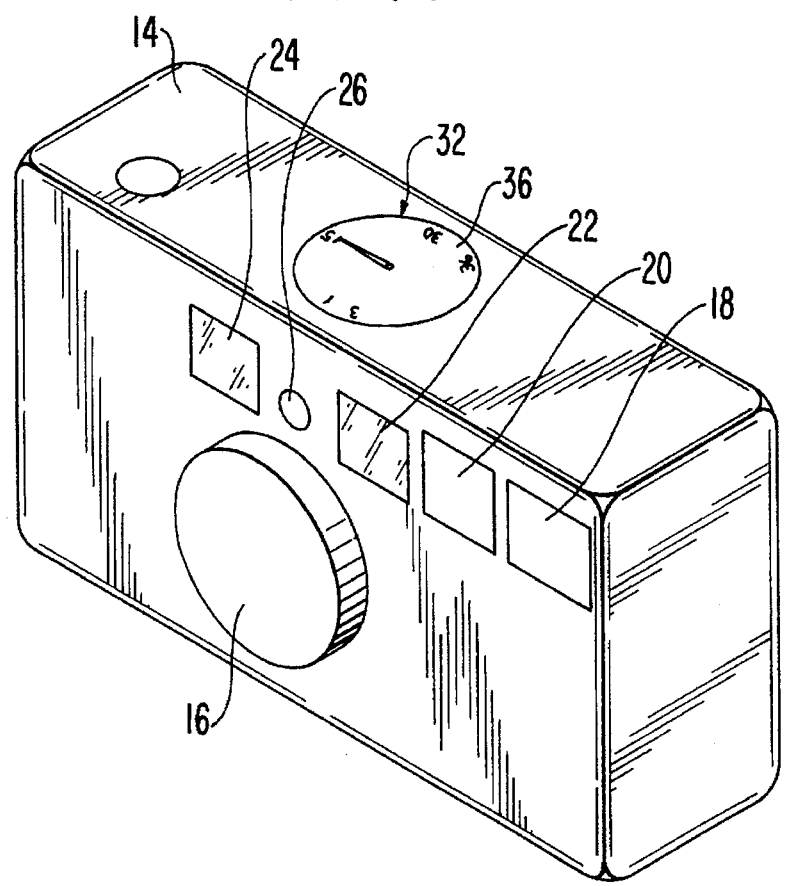
FIG. 1 is a perspective view of the exterior of a camera in accordance with a first embodiment of the present invention.

FIG. 1 is a perspective view of a camera according to a first embodiment of the present invention; FIG. 2 is a cross sectional view of the camera according to the first embodiment, and FIG. 3 is a cross sectional view of essential portions of the camera according to the first embodiment, taken along a horizontal plane.

As shown in FIG. 1, a photographic lens barrel 16 protrudes from the front surface of the camera body 14. The light emission window 18 of an electronic flash device, a viewfinder window 20, a rangefinder light projection window 22, a rangefinder light receiving window 24, and a photometer window 26 are also arranged on the front surface of the camera body.

Figure 2:
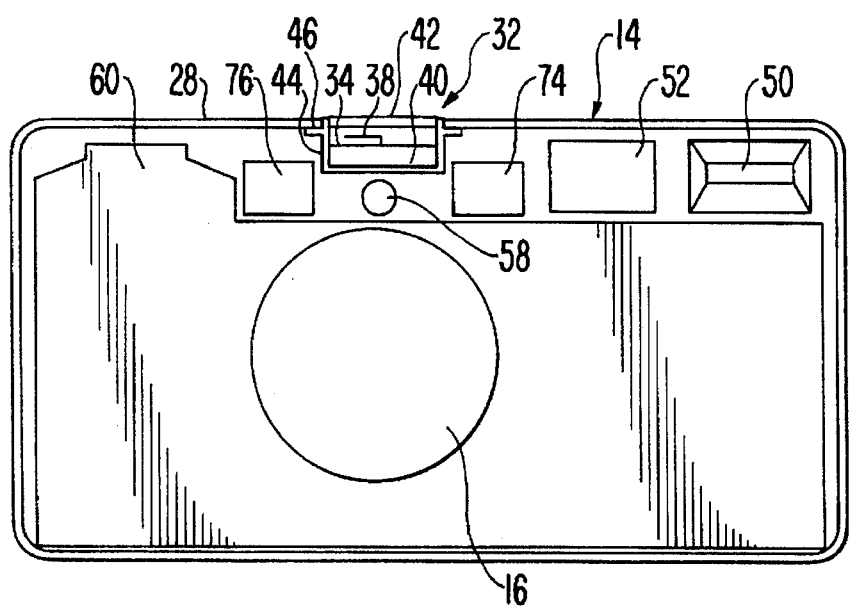
FIG. 2 is a cross sectional view of the front of the camera according to the first embodiment of the present invention.

Furthermore, within the camera body 14, as shown in FIG. 2, corresponding to the respective above-mentioned windows 18, 20, and 26, there are arranged the light generation unit 50 of an electronic flash device, a viewfinder device 52, and a photometer 58. In addition, corresponding to windows 22 and 24, there is arranged a light projection unit 74 and a light receiving unit 76 constituting an active rangefinder device. Moreover, a cartridge compartment 60 is provided and loaded with a film cartridge.

Figure 3:
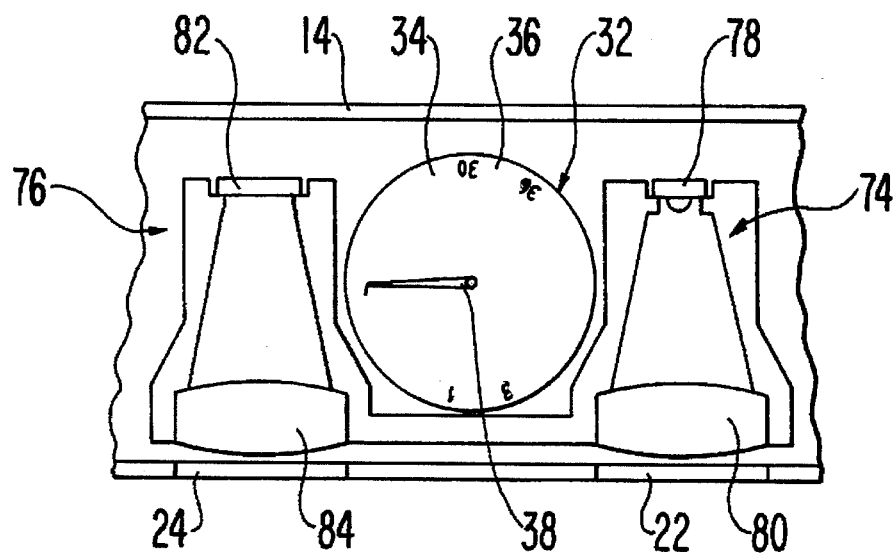
FIG. 3 is a horizontal cross sectional view of essential portions of the first embodiment of the present invention.

The light projection unit 74 comprises, as shown in FIG. 3, a light emitting element 78 and a light projection lens 80. In addition, the light receiving unit 76 comprises a light receiving element 82 and a light receiving lens 84. The light radiated from the light emitting element 78 via the light projection lens 80 and the above-mentioned light projection window 22 is radiated forward in the direction of the object to be photographed. This light, when reflected, is received by the light receiving element 82 via the light receiving window 24 and the light receiving lens 84. The range of the object to be photographed is determined from the signal of the light receiving element 82.

A display device 32 is used, for example, to display a frame count value. The display device 32 has a circular display scale 34, a pointer 38 which points to indices 36 (indicating the frame count value) delineated on the display scale 34, and a drive mechanism 40 which includes a stepping motor to rotate the above-mentioned pointer 38. The drive mechanism 40, including the stepping motor are arranged below the display scale A covering, transparent display window 42 covers the display scale 34. These various elements are located within a display case 44.

This display device 32 is fixed on the upper surface of the camera body 14, between the light projection unit 74 and the light receiving unit 76, which constitute the above-mentioned rangefinder device. The display device 32 is affixed to a camera body cover 28 via a flange portion 46 of the display case 44. As shown in FIG. 2, the lower portion of the drive mechanism unit 40 is inserted into and positioned in a space between the above-mentioned light projection unit 74 and light receiving unit 76. Accordingly, this reduces the height of the camera below that in which the display scale 34 is located, for example, directly above light projection unit 74 or the light receiving unit 76.

In the above-mentioned first embodiment of a camera according to the present invention, the pointer 38, which is driven by the stepping motor of drive mechanism 40, rotates each time a photograph is taken. The index 36 showing the frame count value is indicated by the pointer 38.

Figure 4:
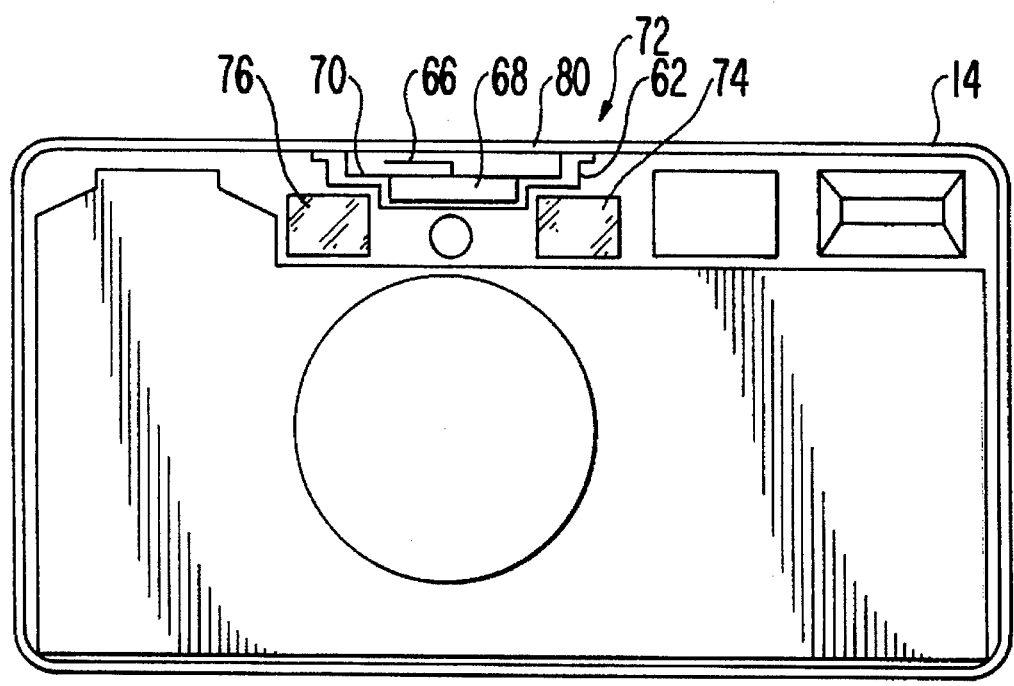
FIG. 4 is a cross sectional view of a camera in accordance with a second embodiment of the present invention.

A second embodiment of the invention will be described with reference to FIG. 4. As embodied herein, the camera has a display device 72 with a display scale 70 larger than that discussed previously. The larger size allows for easy visibility. However, drive mechanism unit 68 located below the display scale 70 is similar in size. A pointer 66 points to indices on the display scale 70; a cover display window 80 is placed above the display scale 70; and a display case 62 holds each of these constituent members. This display device 72, similar to that mentioned above for the first embodiment, has a portion of the drive mechanism unit 68 inserted into a space between the light projecting unit 74 and the light receiving unit 76. Furthermore, a portion of the display scale 70 is mounted in a position above the light projection unit 74 and the light receiving unit 76. In this manner, even though the display scale 70 is made larger than in the first embodiment, the height of the camera body 14 is the same as that mentioned above.

Moreover the above-mentioned display device 72 may be one which indicates an index on a display scale by a pointer rotated by a drive mechanism unit, but its form and constitution are not limited by such examples. Furthermore, the display content is not limited to frame count, and may, for example, be shutter speed, a stop value, or a state in which various modes are set, and the like. Furthermore, the various indices are not limited to numerical values, but may be pictorial symbols.

By the above-mentioned embodiments, a camera can be achieved which is more compact because at least a portion of the display device is inserted into a space between the light projection unit and the light receiving unit of a rangefinder device. The height of the camera body can be reduced below the height of a camera body with the display device located above the light projecting unit or the light receiving unit.

A third embodiment of the invention will be described with reference to FIGS. 5–7. As embodied herein, there is shown a compact camera having camera body 14. A photographic lens barrel 16 for the photographic lens system is located in the approximate center of the upper surface of the camera body.

Furthermore, a photometer device 30 constituting an AE (automatic exposure mechanism) and a rangefinder device 86 constituting an AF (autofocus mechanism) are arranged above the lens barrel 16. Moreover, a viewfinder device 52 with a real image type of viewfinder, and a strobe 88 for use in flash photography, are arranged in the right-hand mid-upper portion of the camera shown in FIG. 5.

Moreover, the above-mentioned real image type of viewfinder used as the viewfinder device 52 is more expensive than an Albada type of viewfinder device. However, the lens can be small. Therefore, it is possible to make the viewfinder device smaller, which is important in making a camera more compact.

Figure 5:
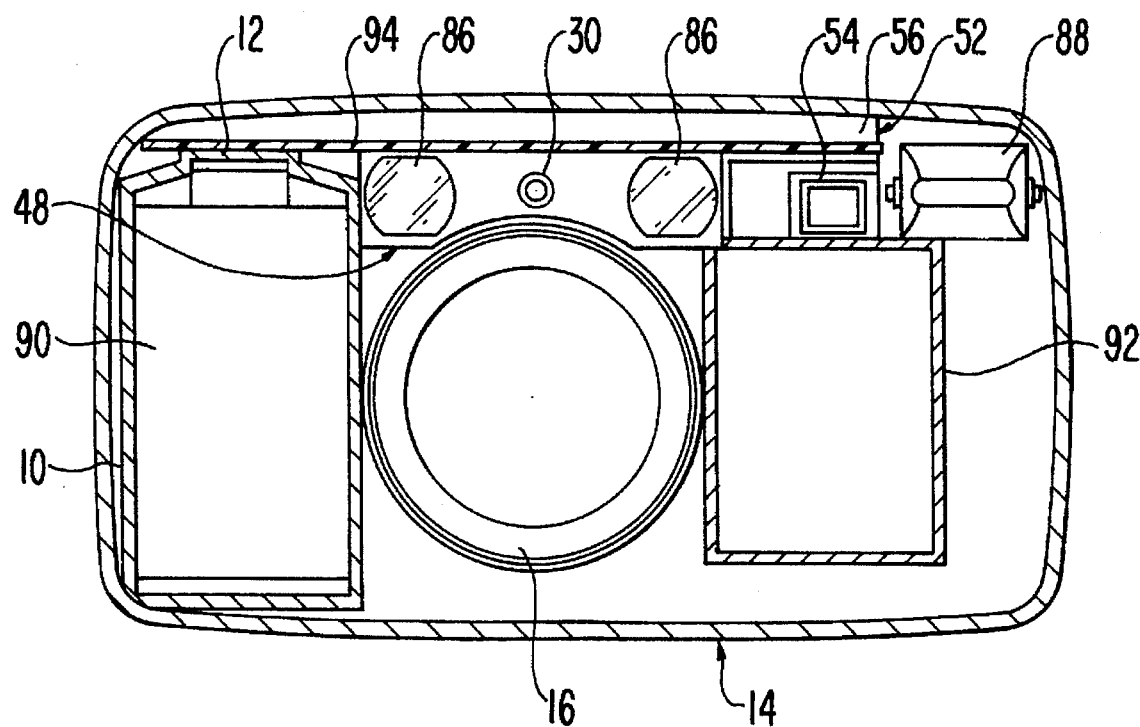
FIG. 5 is a partial sectional and schematic view of the front of a camera in accordance with a third embodiment of the present invention.
Figure 6:
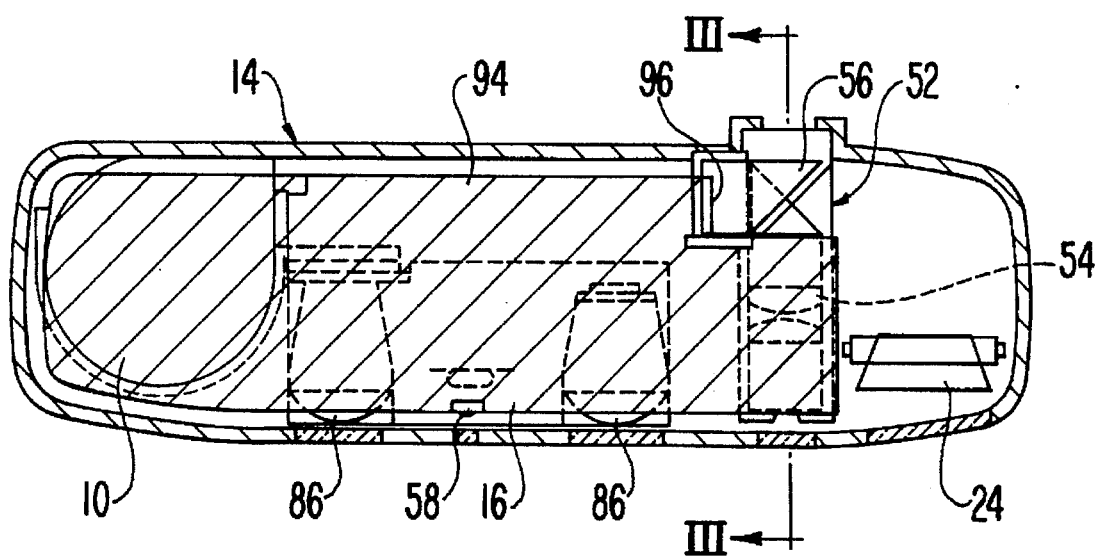
FIG. 6 is a partial sectional and schematic top plane view of the camera shown in FIG. 5 in accordance with the present invention.

A film reverse loading type of compact cartridge compartment 10, loaded with a film cartridge 90 in the reverse loaded state, is located towards one side of the camera body 14 (the mid left-hand side of the camera shown in FIGS. 5 and 6). A spool compartment 92, located on the opposite side from the film reverse loading compact cartridge compartment 10 with the aforementioned photographic lens barrel 16 located therebetween. A film windup spool is not shown in the drawings but is used to wind up film after each photographic operation when the aforementioned film cartridge has been loaded. Once the film has been wound up after the photographic operations, it is rewound into the cartridge 90. The film travels at the rear surface side of the photographic lens barrel 16 located between these two compartments 10 and 92, and a photograph is taken by exposure.

Moreover, in the camera body 14 for the third embodiment, details unnecessary for the invention have been omitted from the drawings, but electric motors are also suitably arranged, which are drive sources for winding the film and for driving a focusing lens system within the photographic lens barrel 16. Moreover, there is provided a battery comprising the power source of these electric motors and of the strobe 88, a capacitor and the like.

According to the present invention, and as embodied in the camera as described above, there is further provided a mounting board 94 comprising various circuits for use in controlling photographic operations incorporated and located within the camera body 14. The mounting board 94 is constituted by a single rigid board and is located on the upper, inner side of the camera body 14 in contact with the outer wall 12 of the upper end of the aforementioned film reverse loading type of cartridge compartment 10. Furthermore, the mounting board 94 is positioned to extend over the upper end of the compact cartridge compartment 10, photographic lens barrel 16 and spool compartment 92, so that the height dimension of the camera body 14 is the minimum necessary. In addition, the size of the mounting board 94 is maintained. Moreover, at least the photometer device 30, rangefinder device 86, or real image type viewfinder device 52 is located in a vacant space 48 formed between this mounting board 94, the photographic lens barrel 16 and the spool compartment 92.

In particular, in the third embodiment for the present invention, it is possible to make the camera smaller and more compact by positioning the mounting board 94 into contact with the outer wall portion of the upper end of the reverse loading type cartridge compartment 10. This is because the mounting board 94 can be located at the lowest limiting position within the camera body 14, due to the positional relationship of the cartridge compartment 10 and mounting board 94. Therefore, the height of the camera body 14 is the minimum necessary, thus making the camera smaller and more compact.

Furthermore, the above-mentioned photometer device 30 and rangefinder device 86 can be constituted as an integral or single block unit, and this integral block unit is located efficiently within the vacant space 48 formed between the aforementioned photographic lens barrel 16 and the mounting board 94.

In particular, the photometer device 30 and rangefinder device 86 are mounted on the lower surface of the mounting board 94. This increases the efficient use of space within the camera body 14. In addition, this configuration has an advantage from the standpoint of assembly, and allows the size of the mounting board 94 to be large.

Figure 7:
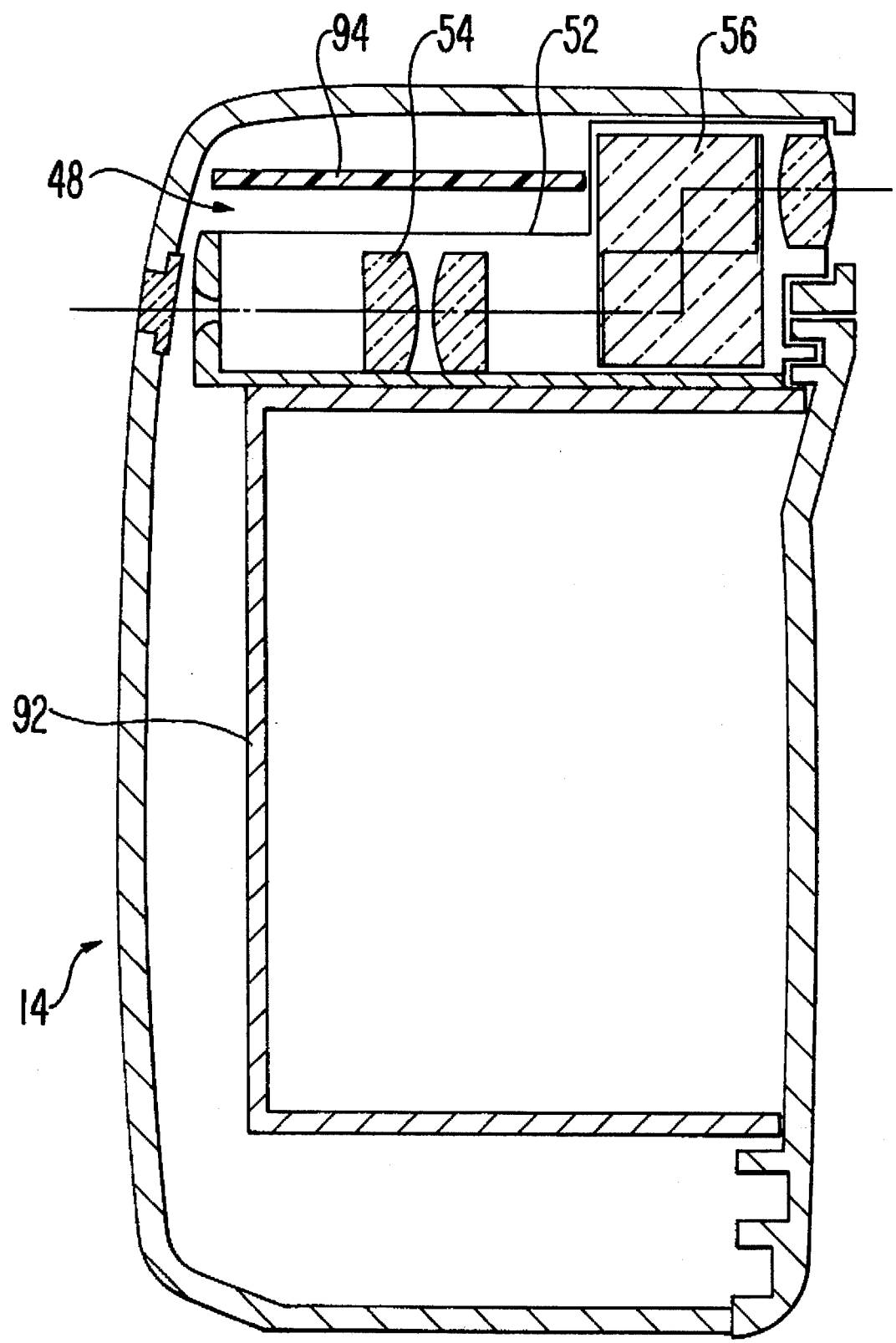
FIG. 7 is a sectional view of the camera shown in FIG. 6, taken along the line III—III in FIG. 6.

Moreover, as can be readily seen from FIGS. 5–7, a real image type of viewfinder can be used as the viewfinder device 52. The real image type of viewfinder has a higher cost than the Albada type, but it can be of a smaller form. Moreover, in this real image type viewfinder device 52, an objective lens system 54 is located between the spool compartment 92 and the mounting board 94. The objective lens system 54 is placed such that the height dimension of the camera can be constrained and, in addition, the area of the mounting board 94 can be made large.

Furthermore, as can be readily seen from FIGS. 5–7, one portion of the real image type of viewfinder device 52 is furnished with an inverting lens system 56 that has an upward bulging shape; however, in this embodiment the mounting board 94 in the area corresponding to this inverting lens system 56, as shown from the shape of the mounting board 94 by the oblique lines in FIG. 6, can have a portion shaped to avoid this inverting lens system 56. This is made possible by having a cut-away portion 96 in the board 94; by this, the size of the mounting board 94 can still be maintained at its maximum limit.

Accordingly, in this embodiment using a real image type of viewfinder device 52, a rear low objective lens system 54 can be located between the mounting board 94 and the spool compartment 92. By arranging only the partial rear high viewfinder inverting lens system 56 to avoid the mounting board 94, only this inverting lens system 56 projects above the mounting board 94. As a result, the camera height dimensions are kept to the minimum limit, and the size and area of this mounting board 94 are enlarged to the maximum limit and corresponding advantageous effects are obtained.

In the above-mentioned embodiment of the invention, because the mounting board 94 is not a flexible printed board but can be made from an inexpensive rigid board, it is less costly and easier to assemble than a flexible printed board. Moreover, the rangefinder 86 and the photometer 58 are easily mounted.

Thus, by employing such a structure, the camera height is kept to a minimum and the camera body can be designed to be made smaller and more compact. This is because the comparatively inexpensive rigid board 94 containing control circuits is located at the upper end of the camera body 14 along the upper side of the film reverse loading type of cartridge compartment 10, photographic lens barrel 16 and spool compartment 92 and in contact with the outer wall 12 of the upper end of the cartridge compartment 10. In addition, because the rangefinder device 86, the photometer device 58 and the real image type viewfinder device 52 are suitably located in the vacant space 48 between this mounting board 94 and the photographic lens barrel 16, the camera design is superior from the aspect of using space efficiently without reducing the size of the mounting board 94.

As is known and thus omitted from the drawings, on the above-mentioned mounting board 94, various circuit components are mounted as required. In addition, printed circuits and the like can be appropriately formed.

Furthermore, and in accordance with the present invention, in the case in which, for example, the height of the viewfinder device 52 is large, the size of the mounting board 94 is maintained. In addition, the efficiency of assembly within the camera body 14 and the constraint of the height dimensions are advantageously improved, by the use of a mounting board with a corresponding portion cut away 96.

Moreover, the present invention is not limited to the structure for the embodiments described hereinabove, and modifications and alterations may be made to the configuration of the various parts of the camera, the structure and the like, and various modifications can be envisioned from the practice of the invention.

Furthermore, the embodiments described hereinabove exemplify a compact camera; however, the invention is not limited to this, but includes single-lens reflex cameras, and may also be applied to various other types of cameras, and its advantageous effects which may be manifested may be easily understood.

By a camera of the present invention as described hereinabove, a mounting board comprising a single rigid board containing circuits incorporated and located within the camera body and used to control various photographic operations, is located at the inside of the upper end portion of the camera body in contact with the outer wall of the upper end of the film reverse loading type of cartridge compartment and extending over the upper side of the photographic lens barrel and the upper side of the spool compartment. In addition, because at least a photometer device, a rangefinder device or a real image type of viewfinder device has been located in a vacant space formed between the mounting board, the photographic lens barrel and spool compartment, in spite of a simple structure, excellent effects as recited hereinbelow are conferred:

(1) Because one or more of the rangefinder device, the photometer device and a real image viewfinder device are located between the mounting board and the photographic lens barrel, the efficient use of space within the camera body is high.

(2) Because the mounting board can be a rigid board, the cost can be constrained.

(3) Because the mounting board can be cut away when the viewfinder device is high, the height dimensions of the camera can be kept within the required minimum limits, and the camera body can be designed to be smaller and more compact.

(4) Because the mounting board is located in contact with the upper end side outer wall portion of the film reverse type of cartridge compartment, the height dimensions of the camera can be very effectively constrained.

(5) By making the mounting board with a corresponding portion cut away, efficient assembly into the camera and constraint of the height dimension are performed, for example when assembling components with high portions such as a real image type of viewfinder device.

Thus, it is intended that the present invention cover the modifications and variations in the cameras in accordance with the invention within the scope of the appended claims and their equivalents and without limitation to the different applications for the camera.

What is claimed is:

1. A camera comprising:
   (a) a camera body having an upper surface;
   (b) a rangefinder device fixed to measure the distance to an object to be photographed, the rangefinder device including
      (i) a light projection unit to project light toward the object to be photographed; and
      (ii) a light receiving unit, separated from the light projection unit by a space, to receive light reflected from the object to be photographed; and (c) a display device fixed onto the upper surface of the camera body, wherein a portion of the display device extends from the upper surface of the camera body within the space separating the light projection unit and the light receiving unit and intersects a plane in which a top surface of the light projecting unit and light receiving unit lie;

(d) a film reverse loading type of cartridge compartment incorporated into the camera body;

(e) a film windup spool compartment incorporated into the camera body;

(f) a photographic lens barrel having a portion with an upper end located in-between the film reverse loading type of cartridge compartment and the film windup spool compartment in the camera body; and (g) a mounting board incorporated within the camera body and extending along the upper, inner side of the camera body above the film reverse type of cartridge compartment, the photographic lens barrel and the spool compartment.

2. A camera according to claim 1, wherein the mounting board is in contact with an upper end of the cartridge compartment.

3. A camera comprising:

(a) a camera body having an upper surface;

(b) a rangefinder device fixed to measure the distance to an object to be photographed, the rangefinder device including (i) a light projection unit to project light toward the object to be photographed; and (ii) a light receiving unit, separated from the light projection unit by a space, to receive light reflected from the object to be photographed; and (c) a display device fixed onto the upper surface of the camera body, wherein a portion of the display device extends from the upper surface of the camera body within the space separating the light projection unit and the light receiving unit and intersects a plane in which a top surface of the light projecting unit and light receiving unit lie.

4. The camera according to claim 3, wherein said display device comprises:

a circular display scale having a frame count value;

indices on said circular display scale indicating the frame count value;

a pointer pointing to said indices;

a drive mechanism having a stepping motor located below the circular display scale to rotate the pointer; and a transparent display window covering the circular display scale.

5. A camera as recited in claim 3, wherein a portion of the display device is located above at least one of the light receiving unit and the light projection unit.

6. A camera comprising:

(a) a camera body with an upper, inner side;

(b) a film reverse loading type of cartridge compartment incorporated into the camera body;

(c) a film windup spool compartment with an upper end and incorporated into the camera body;

(d) a photographic lens barrel having a portion with an upper end located in-between the film reverse loading type of cartridge compartment and the film windup spool compartment in the camera body;

(e) a circuit mounting board incorporated within the camera body and extending along the upper, inner side of the camera body above the film reverse type of cartridge compartment, the photographic lens barrel and the spool compartment; and (f) a camera device located between the circuit mounting board, the photographic lens barrel, and the spool compartment, wherein the circuit mounting board includes a cut-away portion through which a part of the camera device projects.

7. A camera according to claim 6, wherein the mounting board is in contact with an upper end of the cartridge compartment.

8. A camera comprising:

(a) a camera body with an upper, inner side;

(b) a film reverse loading type of cartridge compartment incorporated into the camera body;

(c) a film windup spool compartment incorporated into the camera body;

(d) a photographic lens barrel having a portion with an upper end located in-between the film reverse loading type of cartridge compartment and the film windup spool compartment in the camera body;

(e) a circuit mounting board incorporated within the camera body and extending along the upper, inner side of the camera body above the film reverse type of cartridge compartment, the photographic lens barrel and the spool compartment, and in contact with an upper end of the cartridge compartment; and (f) a rangefinder device and a photometer device mounted on the mounting board and located between the mounting board, the photographic lens barrel, and the spool compartment.

9. A camera according to claim 8, wherein the mounting board is a single rigid board.

10. A camera comprising:

(a) a camera body with an upper, inner side;

(b) a film reverse loading type of cartridge compartment incorporated into the camera body;

(c) a film windup spool compartment incorporated into the camera body;

(d) a photographic lens barrel having a portion with an upper end located in-between the film reverse loading type of cartridge compartment and the film windup spool compartment in the camera body;

(e) a circuit mounting board incorporated within the camera body and extending along the upper, inner side of the camera body above the film reverse type of cartridge compartment, the photographic lens barrel and the spool compartment, and in contact with an upper end of the cartridge compartment; and (f) a viewfinder device located between the mounting board and the spool compartment.

11. A camera according to claim 10, wherein the mounting board is a single rigid board.

12. A camera according to claim 10, wherein said viewfinder device is a real image type and the mounting board includes a cut-away portion through which a part of the viewfinder device projects.

13. A camera according to claim 12, wherein the mounting board is a single rigid board.

* * * * *